United States Patent
Christoffer et al.

(10) Patent No.: US 10,612,603 B2
(45) Date of Patent: Apr. 7, 2020

(54) SYNCHRONIZING DEVICE AS WELL AS A GEAR CHANGING TRANSMISSION FOR A VEHICLE

(71) Applicant: OERLIKON FRICTION SYSTEMS (GERMANY) GMBH, Bremen (DE)

(72) Inventors: Ulf Christoffer, Bremen (DE); Nils Weber, Hannover (DE); Marcus Spreckels, Oyten (DE)

(73) Assignee: OERLIKON FRICTION SYSTEMS (GERMANY) GMBH, Bremen (DE)

( * ) Notice: Subject to any disclaimer, the term of this patent is extended or adjusted under 35 U.S.C. 154(b) by 96 days.

(21) Appl. No.: 15/683,147

(22) Filed: Aug. 22, 2017

(65) Prior Publication Data

US 2018/0058515 A1    Mar. 1, 2018

(30) Foreign Application Priority Data

Aug. 23, 2016  (EP) ..................... 16185388

(51) Int. Cl.
*F16D 23/02* (2006.01)
*F16D 23/06* (2006.01)
*F16D 23/04* (2006.01)

(52) U.S. Cl.
CPC .......... *F16D 23/025* (2013.01); *F16D 23/04* (2013.01); *F16D 23/06* (2013.01); *F16D 2023/0681* (2013.01); *F16D 2200/0052* (2013.01)

(58) Field of Classification Search
CPC combination set(s) only.
See application file for complete search history.

(56) References Cited

U.S. PATENT DOCUMENTS 3,366,208 A * 1/1968 Kelbel ................. F16D 23/06
                                                                  192/53.343
4,413,715 A * 11/1983 Michael ............... F16D 23/06
                                                                  192/53.31
(Continued)

FOREIGN PATENT DOCUMENTS

DE       199 28 597        12/1999
DE     102013106112      * 12/2014
(Continued)

OTHER PUBLICATIONS

Europe Search Report conducted in counterpart Europe Appln. No. 16185388.2 (dated Feb. 24, 2017).

*Primary Examiner* — Mark A Manley
(74) *Attorney, Agent, or Firm* — Greenblum & Bernstein, P.L.C.

(57) ABSTRACT

Synchronizing device (1) of a gear changing transmission for a vehicle. The synchronizing device includes an inner synchronizer ring (2), a middle synchronizer ring (3) and an outer synchronizer ring (4), wherein in the operating mode the outer synchronizer ring (4). The inner synchronizer ring (2) includes a first conical inner ring body (201) with a first inner surface of the inner ring (2011) and a first outer surface of the inner ring (2012), which each bound the first inner ring body (201) in a radial direction extending to an axial ring axis (8), wherein the first inner surface of the inner ring (2011) extends at a first inner angle ($\alpha_{2011}$) of the inner ring and the first outer surface of the inner ring (2012) at a first outer angle ($\alpha_{2012}$) of the inner ring to the ring axis (8). In order to further increase the synchronizing moment to be transmitted the first inner angle ($\alpha_{2011}$) of the inner ring is smaller than the first outer angle ($\alpha_{2012}$) of the inner ring according to the invention.

11 Claims, 3 Drawing Sheets

(56) References Cited

U.S. PATENT DOCUMENTS

| | | | |
|---|---|---|---|
| 5,657,844 A | | 8/1997 | Wagner |
| 5,969,001 A | * | 10/1999 | Kawai .................. F16D 23/025 |
| | | | 192/107 M |
| 6,533,091 B1 | * | 3/2003 | Kawada .................. F16D 23/06 |
| | | | 192/53.32 |
| 2007/0246320 A1 | * | 10/2007 | Youk ....................... F16D 23/06 |
| | | | 192/53.34 |
| 2008/0017470 A1 | | 1/2008 | Stockl et al. |

FOREIGN PATENT DOCUMENTS

| | | | |
|---|---|---|---|
| EP | 0 717 212 | | 6/1996 |
| EP | 1199489 | * | 4/2002 |
| EP | 1 312 823 | | 5/2003 |
| EP | 1312823 | * | 5/2003 |
| EP | 1 704 342 | | 9/2006 |
| EP | 2159439 | * | 3/2010 |
| EP | 2 677 187 | | 12/2013 |

* cited by examiner

SYNCHRONIZING DEVICE AS WELL AS A GEAR CHANGING TRANSMISSION FOR A VEHICLE

CROSS-REFERENCE TO RELATED APPLICATIONS

The present application claims priority under 35 U.S.C. § 119(a) of European Patent Application No. EP 161 85 388.2 filed Aug. 23, 2016, the disclosure of which is expressly incorporated by reference herein in its entirety.

BACKGROUND OF THE INVENTION

1. Field of the Invention

The invention relates to a synchronizing device for a gear changing transmission according to the preamble of the independent claim 1. The invention further relates to a gear changing transmission for a vehicle according to the independent claim 11.

2. Discussion of Background Information

From DE 199 28 597 and EP 1 312 823 A1 a generic synchronizing device for a gear changing transmission of a vehicle is known from the state of the art. Such a triple synchronizing device comprises an outer synchronizer ring, a middle synchronizer ring and an inner synchronizer ring. In the operating mode the outer synchronizer ring and the inner synchronizer ring are connected essentially torque proof with a first shifting element, and the middle synchronizer ring is connected essentially torque proof with a second shifting element, which is designed as a gear wheel to be shifted. The middle synchronizer ring comprises a first conical middle ring body having a first inner surface of the middle ring and a first outer surface of the middle ring, which each bound the first middle ring body in a radial direction extending to an axial ring axis. The first inner surface of the middle ring extends at a first inner angle of the middle ring and the first outer surface of the middle ring extends at a first outer angle of the middle ring to the ring axis, the first inner angle of the middle ring and the first outer angle of the middle ring being the same size, i.e. the first inner surface of the middle ring and the first outer surface of the middle ring are parallel to each other. The outer and the inner synchronizer ring are designed and arranged in such a way, that the first inner surface of the middle ring directly interacts with the inner synchronizer ring and the first outer surface of the middle ring directly interacts with the outer synchronizer ring during a synchronization process, wherein the outer and the inner synchronizer ring are displaced in direction to the gear wheel to be synchronized.

The synchronizing devices according to the two documents mentioned above, both having an inner synchronizer ring, comprising a first conical inner ring body with a first inner surface of the inner ring and a first outer surface of the inner ring, which each bound the first inner ring body in a radial direction extending to the axial ring axis. Whereby the first inner surface of the inner ring extends at a first inner angle of the inner ring and the first outer surface of the inner ring at a first outer angle of the inner ring to the ring axis. The difference between the two versions is, that in the case of the synchronizing device of DE 199 28 597 the first inner surface of the inner ring and the first outer surface of the inner ring are arranged parallel to each other whereas in the case of the synchronizing device of EP 1 312 823 A1 the first inner angle of the inner ring is larger than the first outer angle of the inner ring, i.e. the first inner surface of the inner ring and the first outer surface of the inner ring are not parallel to each other. Hereby it is achieved, in contrast to the synchronizing device of DE 199 28 597, that in the event of incorrect operating the synchronizing device, i.e. particularly during long-lasting pre-synchronizing of a gear with corresponding heat development, the service life of the synchronizing device is improved.

The conflict, already known from single synchronizing devices and described in EP 2677187 A1, between achieving a high shifting capacity with simultaneous high shifting convenience is, of course, also present regarding the triple synchronizing device shown above. This conflict leads to a high shifting capacity, i.e. the transmission of a high synchronizing moment at a low shifting force by a small cone angle of the friction combination. But the self-locking effect preventing loosening of the friction surfaces and substantially and noticeable affecting the shifting convenience of the driver sets a limit to the minimization of the cone angle.

Compared to a dual synchronizing device, both the synchronizing device according to DE 199 28 597 and EP 1 312 823 A1 enable the transmission of a higher synchronizing moment at an acceptable shifting quality. However, increased requirements to the shifting capacity are imposed with respect to a novel triple synchronizing device, shifting quality and installation space remaining the same.

SUMMARY OF THE EMBODIMENTS

Thus, the object of the invention is providing a multiple synchronizing device, by means of which the shifting capacity can be increased with the same shifting quality and without an increased installation space.

The objects of the invention solving this problem are characterized by the features of the independent claim 1.

The dependent claims relate to particularly advantageous embodiments of the invention.

Hence the invention relates to a synchronizing device for a gear changing transmission, comprising an outer synchronizer ring, a middle synchronizer ring and an inner synchronizer ring. Though the inner synchronizer ring comprises a first conical inner ring body having a first inner surface of the inner ring and a first outer surface of the inner ring, which each bound the first inner ring body in a radial direction extending to an axial ring axis. The first inner surface of the inner ring extends at a first inner angle of the inner ring and the first outer surface of the inner ring at a first outer angle of the inner ring to the ring axis.

According to the invention, the first inner angle of the inner ring is smaller than the first outer angle of the inner ring. I.e. the synchronizing device has at least a small angle at the inner synchronizer ring which contributes to the transmission of a high synchronizing moment having a positive effect on the shifting quality and the installation space. At the same time, the synchronizing device has a large angle at the inner synchronizer ring, which contributes to the loosening of the inner and outer synchronizer ring. Hereby the self-locking is minimized having a positive effect on the shifting quality.

Within the framework of this invention the "operating mode" represents the state of the synchronizing process, wherein the outer and the inner synchronizer ring are displaced in direction to the gear wheel to be synchronized. In the operating mode the outer and the inner synchronizer ring are in friction contact with the middle synchronizer ring and thereby friction-locked generating a synchronizing moment.

Additionally, within the framework of this invention the term "loosening" means the transmission of the synchronizing device from the operating mode to a non-operating mode, the non-operating mode representing the state of the synchronizing process, wherein the outer and the inner synchronizer ring are displaced away from the gear wheel to be synchronized, i.e. that they are not engaged with the middle synchronizer ring and that they substantially not transmit any synchronizing moment.

In order to get from the non-operating mode to the operating mode and vice versa, the inner, middle and outer synchronizer ring have the following different types of surfaces: friction surface, loosening surface and friction/loosening surface. A friction surface extends at a small angle, particularly at an angle of 3°-5° to the axial ring axis and serves only for transmitting the synchronizing moment and dissipates the friction energy arising by the conversion of the kinetic energy. A loosening surface extends at a large angle, particularly at an angle of 6°-9° to the axial ring axis and serves only for loosening. No appreciable relative movement takes place between the contacting surfaces at a loosening surface. A friction/loosening surface extends at a large angle to the axial ring axis and serves for transmitting the synchronizing moment as well as for loosening.

Within the framework of this invention a functional friction surface is to be understood as a friction surface or as a friction/loosening surface. Within the framework of this invention a functional loosening surface is to be understood as a loosening surface or as a friction/loosening surface.

The middle synchronizer ring comprises a first conical middle ring body, the first middle ring body comprising a first inner surface of the middle ring and a first outer surface of the middle ring, which each bound the first middle ring body in a radial direction extending to the axial ring axis. The first inner surface of the middle ring extends at a first inner angle of the middle ring and the first outer surface of the middle ring at a first outer angle of the middle ring to the ring axis. Within the framework of this invention the first inner angle of the middle ring and the first outer angle of the middle ring can be identical. It is also possible, that the first inner angle of the middle ring and the first outer angle of the middle ring are different, i.e. the first inner angle of the middle ring being smaller than the first outer angle of the middle ring or the first outer angle of the middle ring being smaller than the first inner angle of the middle ring.

Regarding an embodiment, which is very important in practice, the inner synchronizer ring is made of the first conical inner ring body and a second conical inner ring body. The second inner ring body comprising a second inner surface of the inner ring and a second outer surface of the inner ring, which each bound the second inner ring body in a radial direction extending to the axial ring axis, wherein the second inner surface of the inner ring extends at a second inner angle of the inner ring and the second outer surface of the inner ring at a second outer angle of the inner ring to the ring axis. Here the second inner angle of the inner ring corresponds to the first outer angle of the inner ring. The second inner surface of the inner ring is form-locking connected, at least partially, to the first outer surface of the inner ring and the second outer surface of the inner ring interacts with the middle synchronizer ring in the operating mode.

Due to the two-piece design of the inner synchronizer ring an additional loosening surface is established facilitating the loosening at the transition from the operating mode to the non-operating mode.

Preferably, but not necessarily, the middle synchronizer ring may comprise a second conical middle ring body in addition to the first conical middle ring body, the first middle ring body comprising a first inner surface of the middle ring and a first outer surface of the middle ring, which each bound the first middle ring body in a radial direction extending to the axial ring axis, the first inner surface of the middle ring extending at a first inner angle of the middle ring and the first outer surface of the middle ring at a first outer angle of the middle ring to the ring axis, and the second middle ring body comprising a second inner surface of the middle ring and a second outer surface of the middle ring, which each bound the second middle ring body in a radial direction extending to the axial ring axis, the second inner surface of the middle ring extending at a second inner angle of the middle ring and the second outer surface of the middle ring at a second outer angle of the middle ring to the ring axis, wherein the second inner angle of the middle ring corresponds to the first outer angle of the middle ring, and in the operating mode the first inner surface of the middle ring interacting with the inner synchronizer ring, the second inner surface of the middle ring being in contact with the first outer surface of the middle ring and the second outer surface of the middle ring interacting with the outer synchronizer ring.

The two-piece design of the middle synchronizer ring results in an additional loosening surface, thereby facilitating the loosening at the transition from the operating mode to the non-operating mode.

It also proved to be advantageous the synchronizing device comprising an intermediate synchronizer ring with a conical intermediate ring body, wherein the intermediate ring body comprising an inner surface of the intermediate ring and an outer surface of the intermediate ring, which each bound the intermediate ring body in a radial direction extending to the axial ring axis. Thereby the inner surface of the intermediate ring extends at an inner angle of the intermediate ring and the outer surface of the intermediate ring at an outer angle of the intermediate ring to the ring axis, wherein the intermediate synchronizer ring is arranged between the outer synchronizer ring and the middle synchronizer ring and is connected torque proof with the inner synchronizer ring and the outer synchronizer ring and the inner angle of the intermediate ring corresponds to the first outer angle of the middle ring and the outer angle of the intermediate ring corresponds to an inner angle of the outer ring in the operating mode. Hereby, the inner surface of the intermediate ring interacts with the first outer surface of the middle ring and the outer surface of the intermediate ring is in contact with the outer synchronizer ring in the operating mode.

The intermediate synchronizer ring results in an additional loosening surface, thereby facilitating the loosening at the transition from the operating mode to the non-operating mode.

It is also advantageous for transmitting a high synchronizing moment, if the first inner angle of the inner ring and/or the second outer angle of the inner ring and/or the first inner angle of the middle ring and/or the first outer angle of the middle ring and/or the second outer angle of the middle ring and/or the inner angle of the intermediate ring is 3-5°.

In order to ensure a secure transmission of the synchronizing device from the operating mode to the non-operating mode it is also advantageous if the first inner ring body and/or the second inner ring body and/or the first middle ring body and/or the second middle ring body and/or the intermediate ring body has a cutoff in a circumferential direction extending to the axial ring axis. The cutoff is open or closed in the non-operating mode.

It also proved to be advantageous in practice, the first inner ring body and/or the second inner ring body and/or the first middle ring body and/or the second middle ring body and/or the intermediate ring body having at least one limit stop for axial fixing in direction to the ring axis.

It is also proved to be advantageous for transmitting a high synchronizing moment if a friction layer, especially a friction layer in the form of a carbon friction layer is provided at the first inner surface of the inner ring and/or at the first outer surface of the inner ring and/or at the second inner surface of the inner ring and/or at the second outer surface of the inner ring and/or at the first inner surface of the middle ring and/or at the first outer surface of the middle ring and/or at the second inner surface of the middle ring and/or at the second outer surface of the middle ring and/or at the inner surface of the intermediate ring and/or at the outer surface of the intermediate ring.

Finally, it is advantageous providing an adhesion reducing surface structure at the first inner surface of the inner ring and/or at the first outer surface of the inner ring and/or at the second inner surface of the inner ring and/or at the second outer surface of the inner ring and/or at the first inner surface of the middle ring and/or at the first outer surface of the middle ring and/or at the second inner surface of the middle ring and/or at the second outer surface of the middle ring and/or at the inner surface of the intermediate ring and/or at the outer surface of the intermediate ring. Hereby a secure transmission of the synchronizing device from the operating mode to the non-operating mode is ensured.

BRIEF DESCRIPTION OF THE DRAWINGS

The invention is explained in more detail below with reference to the schematic drawing. It is shown.

DETAILED DESCRIPTION OF THE EMBODIMENTS

In the following it is referred to FIG. 1 to explain a synchronizing device known from the state of the art. In order to distinguish the state of the art from the present invention the reference signs referring to features of a synchronizing device known from the state of the art have an inverted comma, while features of embodiments according to the invention have reference sign without an inverted comma.

Figure 1:
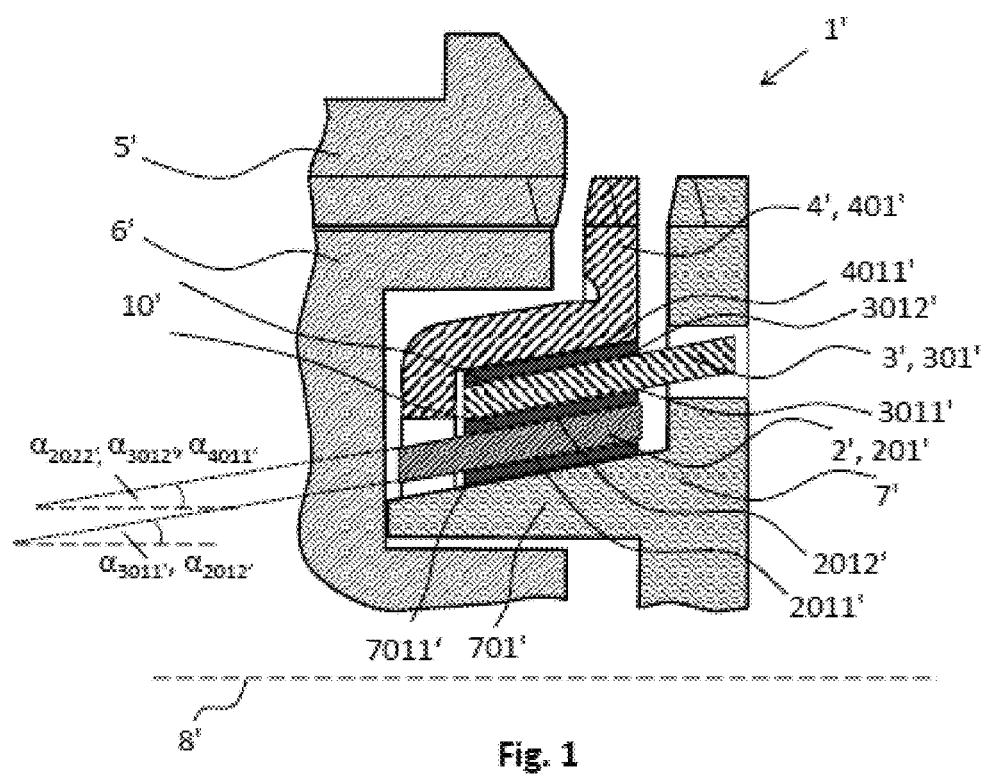
FIG. 1 a cross-section of a synchronizing device known from the state of the art.

FIG. 1 shows a cross-section of a synchronizing device 1' known from the state of the art comprising an inner synchronizer ring 2', a middle synchronizer ring 3' and an outer synchronizer ring 4'. In a manner known per se the synchronizing device 1' also has a sliding sleeve 5' with a synchronizer body 6' and a gear wheel 7'. The outer synchronizer ring 4' and the inner synchronizer ring 2' are connected essentially torque proof with the synchronizer body 6' and the middle synchronizer ring 3' is connected essentially torque proof with the gear wheel 7'. The components mentioned above are coaxially arranged to a ring axis 8' in such a way, the inner synchronizer ring 2' and the outer synchronizer ring 4' being displaceable together along the ring axis 8' in direction to the gear wheel 7' by the sliding sleeve 5' during the synchronizing process, so that the inner synchronizer ring 2' and the outer synchronizer ring 4' can be engaged with the gear wheel 7'.

The gear wheel 7' has a conical gear wheel shoulder 701', so that a synchronizing moment can be transmitted to the inner synchronizer ring 2' in the operating mode.

Hereby the gear wheel shoulder 701' has a gear wheel shoulder surface 7011' extending to the ring axis 8' at a gear wheel shoulder angle $\alpha_{7011'}$. The inner synchronizer ring 2' comprises a first conical inner ring body 201' having a first inner surface of the inner ring 2011' and a first outer surface of the inner ring 2012', which each bound the first inner ring body 201' in the radial direction extending to the radial ring axis 8'. The first inner surface of the inner ring 2011' extends at a first inner angle $\alpha_{2011'}$ of the inner ring and the first outer surface of the inner ring 2012' extends at a first outer angle $\alpha_{2012'}$ of the inner ring to the ring axis 8'. The first inner angle $\alpha_{2011'}$ of the inner ring and the first outer surface of the inner ring 2012' are the same size, i.e. the first inner surface of the inner ring 2011' and the first outer surface of the inner ring 2012' are parallel to each other. The inner angle $\alpha_{2011'}$ of the inner ring corresponds to the gear wheel shoulder angle $\alpha_{7011'}$, so that the inner surface of the inner ring 2011' and the gear wheel shoulder surface 7011' interact in the operating mode.

The middle synchronizer ring 3' also comprises a first conical middle ring body 301' having a first inner surface of the middle ring 3011' and a first outer surface of the middle ring 3012', which each bound the first middle ring body 301' in a radial direction extending to the radial ring axis 8'. The first inner surface of the middle ring 3011' extends at a first inner angle $\alpha_{3011'}$ of the middle ring and the first outer surface of the middle ring 3012' extends at a first outer angle $\alpha_{3012'}$ of the middle ring to the ring axis 8'. As with the inner synchronizer ring 2' the first inner angle $\alpha_{3011'}$ of the middle ring and the first outer angle $\alpha_{3012'}$ of the middle ring are the same size, i.e. the first inner surface of the middle ring 3011' and the first outer surface of the middle ring 3012' also are parallel to each other.

The outer synchronizer ring 4' comprises an outer ring body 401' having an inner surface of the outer ring 4011', extending at an inner angle $\alpha_{4011'}$ of the outer ring to the ring axis 8', the inner angle $\alpha_{4011'}$ of the outer ring being the same size as the first outer angle $\alpha_{3012'}$ of the middle ring.

Thus, the inner and the outer synchronizer ring 2', 4' are designed and arranged, that the first inner surface of the inner ring 2011' is in friction contact with the gear wheel shoulder surface 7011', the first inner surface of the middle ring 3011' is in friction contact with the first outer surface of the inner ring 2012' and the first outer surface of the middle ring 3012' is in friction contact with the inner surface of the outer ring 4011' during a synchronization process when displacing the inner and the outer synchronizer ring 2', 4' in direction to the gear wheel to be synchronized. For this purpose, the surfaces being in friction contact have a friction layer 10', namely the first inner surface of the inner ring 2011' and the gear wheel shoulder surface 7011' or the first outer surface of the inner ring 2012' and the first inner surface of the middle ring 3011', respectively, or the first outer surface of the middle ring 3012' and the inner surface of the outer ring 4011', respectively. In order to ensure a secure transmission of the synchronizing device from the operating mode to the non-operating mode all angles are large angles. I.e. the synchronizing device according to the state of the art is a configuration of a synchronizing device with three friction/loosening surfaces.

FIG. 2a-2d show cross-sections of four different synchronizing devices 1 according to the invention with three functional friction surfaces.

The gear wheel 7 has a conical gear wheel shoulder 701 in all these synchronizing devices 1, so that a synchronizing moment can be transmitted to the inner synchronizer ring 2 in the operating mode. There the gear wheel shoulder 701 has a gear wheel shoulder surface 7011 extending at a gear wheel shoulder angle $\alpha_{7011}$ to the ring axis 8.

Figure 2A:
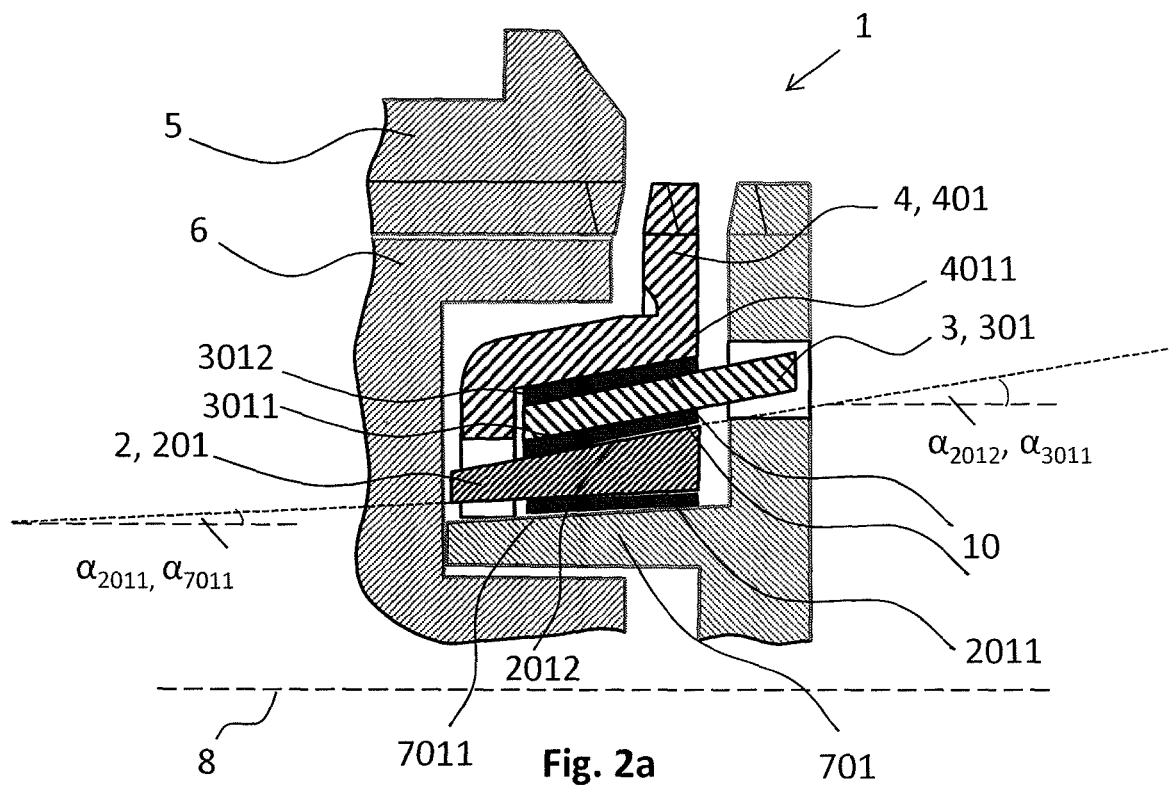
FIG. 2a a cross-section of a first embodiment of a synchronizing device according to the invention having three functional friction surfaces.

FIG. 2a shows a cross-section of a first embodiment of a synchronizing device 1 according to the invention with three functional friction surfaces.

The synchronizing device 1 comprises an inner synchronizer ring 2, a middle synchronizer ring 3 and an outer synchronizer ring 4. The synchronizing device 1 also has a sliding sleeve 5 with a synchronizing body 6 and a gear wheel 7 as already described above with reference to FIG. 1. The outer synchronizer ring 4 and the inner synchronizer ring 2 are connected essentially torque proof with the synchronizing body 6 and the middle synchronizer ring 3 is connected essentially torque proof with the gear wheel 7. The components mentioned above are coaxially arranged to a ring axis 8 in such a way, the inner synchronizer ring 2 and the outer synchronizer ring 4 being displaceable together along the ring axis 8 in direction to the gear wheel 7 by the sliding sleeve 5 during the synchronizing process, so that the inner synchronizer ring 2 and the outer synchronizer ring 4 can be engaged with the gear wheel 7.

The inner synchronizer ring 2 comprises a first conical inner ring body 201 having a first inner surface of the inner ring 2011 and a first outer surface of the inner ring 2012, which each bound the first inner ring body 201 in the radial direction extending to the axial ring axis 8. The first inner surface of the inner ring 2011 extends at a first inner angle $\alpha_{2011}$ of the inner ring and the first outer surface of the inner ring 2012 extends at a first outer angle $\alpha_{2012}$ of the inner ring to the ring axis 8. The first inner angle $\alpha_{2011}$ of the inner ring is smaller than the first outer angle $\alpha_{2012}$ of the inner ring in contrast to the state of the art (FIG. 1), i.e. the first inner surface of the inner ring 2011 and the first outer surface of the inner ring 2012 are not parallel to each other. The first inner angle $\alpha_{2011}$ of the inner ring corresponds to the gear wheel shoulder angle $\alpha_{7011}$, so that the inner surface of the inner ring 2011 interacts with the gear wheel shoulder surface 7011 in the operating mode. The first inner angle $\alpha_{2011}$ of the inner ring is 3° and the first outer angle $\alpha_{2012}$ of the inner ring is 7° in this embodiment.

The middle synchronizer ring 3 also comprises a first conical middle ring body 301 having a first inner surface of the middle ring 3011 and a first outer surface of the middle ring 3012, which each bound the first middle ring body 301 in a radial direction extending to the radial ring axis 8. The first inner surface of the middle ring 3011 extends at a first inner angle $\alpha_{3011}$ of the middle ring and the first outer surface of the middle ring 3012 extends at a first outer angle $\alpha_{3012}$ of the middle ring to the ring axis 8. The first inner angle $\alpha_{3011}$ of the middle ring and the first outer angle $\alpha_{3012}$ of the middle ring are the same size as with the inner synchronizer ring 2, i.e. the first inner surface of the middle ring 3011 and the first outer surface of the middle ring 3012 also are parallel to each other.

The outer synchronizer ring 4' comprises an outer ring body 401' having an inner surface of the outer ring 4011', extending at an inner angle $\alpha_{4011'}$ of the outer ring to the ring axis 8', the inner angle $\alpha_{4011'}$ of the outer ring being the same size as the first outer angle $\alpha_{3012'}$ of the middle ring.

Thus the inner and the outer synchronizer ring 2, 4 are designed and arranged, that the first inner surface of the middle ring 3011 is in friction contact with the first outer surface of the inner ring 2012 and the first outer surface of the middle ring 3012 is in direct friction contact with the inner surface of the outer ring 4011 during a synchronization process when displacing the inner and the outer synchronizer ring 2, 4 in direction to the gear wheel to be synchronized. For this purpose, the surfaces being in friction contact have a friction layer 10, namely the first outer surface of the inner ring 2012 and the first inner surface of the middle ring 3011 or the first outer surface of the middle ring 3012 and the inner surface of the outer ring 4011, respectively.

This first embodiment of the synchronizing device 1 according to the invention is characterized in that it has a friction surface, i.e. a surface extending at a small angle to the axial ring axis 8 and serving only for transmitting the synchronizing moment, and it has two friction/loosening surfaces extending at a large angle to the axial ring axis 8 and serving for transmitting the synchronizing moment as well as for loosening. Thus, an increased synchronizing moment can be transmitted with the same shifting quality compares to the state of the art.

Figure 2B:
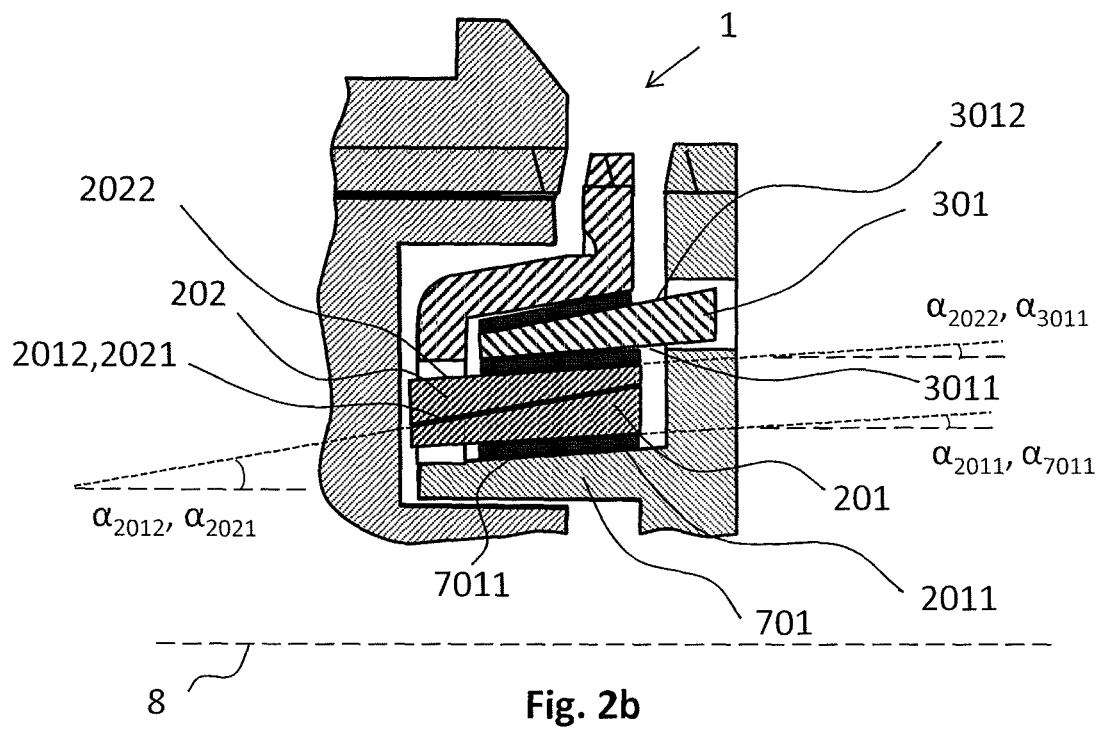
FIG. 2b a cross-section of a second embodiment of a synchronizing device according to the invention having three functional friction surfaces.

FIG. 2b shows a cross-section of a second embodiment of a synchronizing device 1 according to the invention having three functional friction surfaces.

The synchronizing device 1 has an inner synchronizer ring 2 with a first conical inner ring body 201. The first inner ring body 201 has a first inner surface of the inner ring 2011 and a first outer surface of the inner ring 2012, which each bound the first inner ring body 201 in a radial direction extending to the axial ring axis 8, the first inner surface of the inner ring 2011 extending at a first inner angle $\alpha_{2011}$ of the inner ring and the first outer surface of the inner ring 2012 at a first outer angle $\alpha_{2012}$ of the inner ring to the ring axis 8. The first inner angle $\alpha_{2011}$ of the inner ring is small and the first outer angle $\alpha_{2012}$ of the inner ring is large as with the embodiment according to FIG. 2a.

In contrast to the synchronizing device 1 from FIG. 2a the inner synchronizer ring 2 comprising a second conical inner ring body 202 in addition to the first conical inner ring body 201, i.e. the inner synchronizer ring has a two-piece design.

The second inner ring body 202 has a second inner surface of the inner ring 2021 and a second outer surface of the inner ring 2022, which each bound the second inner ring body 202 in a radial direction extending to the axial ring axis 8, the second inner surface of the inner ring 2021 extending at a second inner angle $\alpha_{2021}$ of the inner ring and the second outer surface of the inner ring 2022 at a second outer angle $\alpha_{2021}$ of the inner ring to the ring axis 8. Though the second inner angle $\alpha_{2021}$ of the inner ring corresponds to the first outer angle $\alpha_{2012}$ of the inner ring and the second outer angle $\alpha_{2022}$ of the inner ring corresponds to the first inner angle $\alpha_{2011}$ of the inner ring. The first inner surface of the inner ring 2011 interacts with the gear wheel 7 and the second inner surface of the inner ring 2021 is in contact with the first outer surface of the inner ring 2012 in the operating mode. The second outer surface of the inner ring 2022 interacts with the first inner surface of the middle ring 3011 at the same time.

Furthermore, in contrast to the synchronizing device 1 from FIG. 2a the first inner angle $\alpha_{3011}$ of the middle ring and the first outer angle $\alpha_{3012}$ of the middle ring are not identical, i.e. the first inner surface of the middle ring 3011 and the first outer surface of the middle ring 3012 do not are parallel to each other.

In this embodiment, the first inner angle $\alpha_{2011}$ of the inner ring and the gear wheel shoulder angle $\alpha_{7011}$ are small. At the same time the second outer angle $\alpha_{2022}$ of the inner ring and the first inner angle $\alpha_{3011}$ of the middle ring also are small angles.

Thus, the synchronizing device 1 according to FIG. 2b has two friction surfaces, a friction/loosening surface and a loosening surface.

Figure 2C:
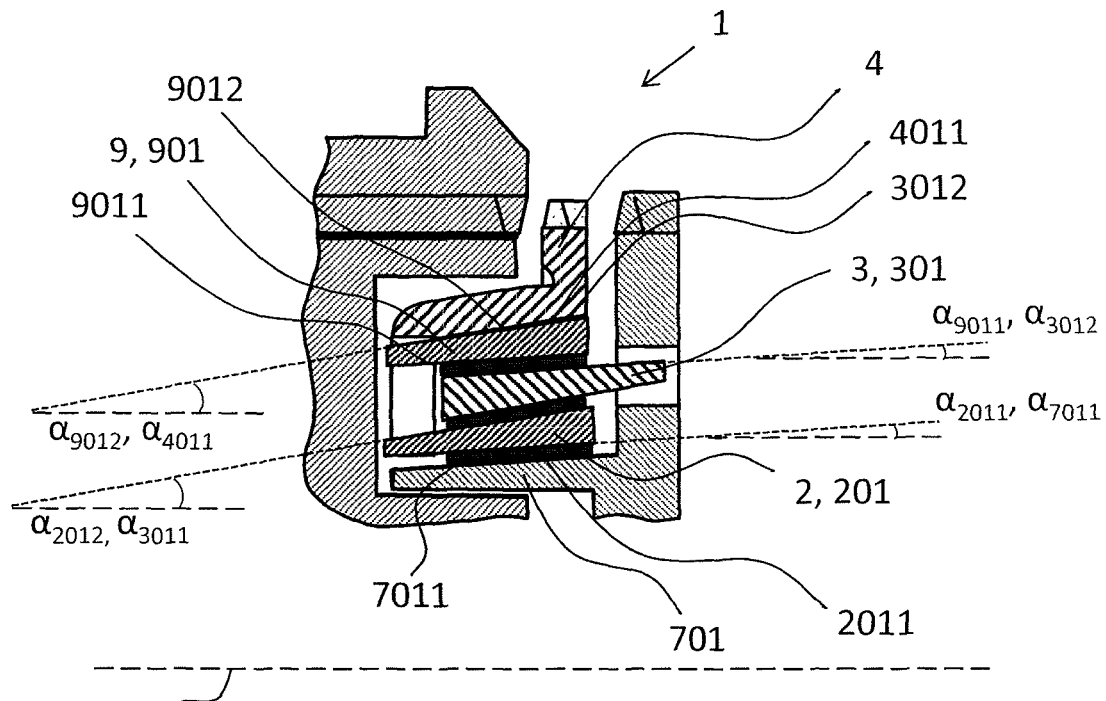
FIG. 2c a cross-section of a third embodiment of a synchronizing device according to the invention having three functional friction surfaces.

FIG. 2c shows a cross-section of a third embodiment of a synchronizing device 1 according to the invention having three functional friction surfaces.

In contrast to the synchronizing devices 1 from FIGS. 2a and 2b the synchronizing device 1 according to FIG. 2c has an additional intermediate synchronizer 9 ring with a conical intermediate ring body 901. The intermediate ring body 901 has an inner surface of the intermediate ring 9011 and an outer surface of the intermediate ring 9012, which each bound the intermediate ring body 901 in a radial direction extending to the axial friction ring axis 8. The inner surface of the intermediate ring 9011 extends at an inner angle $\alpha_{9011}$ of the intermediate ring and the outer surface of the intermediate ring 9012 at an outer angle $\alpha_{9012}$ of the intermediate ring to the ring axis 8. In this embodiment, the inner angle $\alpha_{9011}$ of the intermediate ring is small and the outer angle $\alpha_{9012}$ of the intermediate ring is large. The intermediate synchronizer ring 9 is arranged between the outer synchronizer ring 4 and the middle synchronizer ring 3 and is connected torque proof with the inner synchronizer ring 2 and the synchronizer ring 4 in the operating mode. The inner angle $\alpha_{9011}$ of the intermediate ring corresponds to the first outer angle $\alpha_{3012}$ of the middle ring and the outer angle $\alpha_{9012}$ of the intermediate ring to the inner angle $\alpha_{4011}$ of the outer ring. Thus the inner surface of the intermediate ring 9011 interacts with the first outer surface of the middle ring 3012 in the operating mode and the outer surface of the intermediate ring 9012 is form-locking connected, at least partially, to the outer synchronizer ring.

The first inner surface of the inner ring 2011 extends at a small inner angle $\alpha_{2011}$ of the inner ring. Though the inner angle $\alpha_{2011}$ of the inner ring corresponds to the gear wheel shoulder angle $\alpha_{7011}$, so that the inner surface of the inner ring 2011 and the gear wheel shoulder surface 7011 are interacting in the operating mode. At the same time the outer surface of the inner ring 2012 interacting with the first inner surface of the middle ring 3011 in the operating mode is drifting at a large outer angle $\alpha_{2012}$ of the inner ring.

As the synchronizing device 1 according to FIG. 2b, the synchronizing device 1 according to FIG. 2c also has two friction surfaces, a friction/loosening surface and a loosening surface.

Figure 2D:
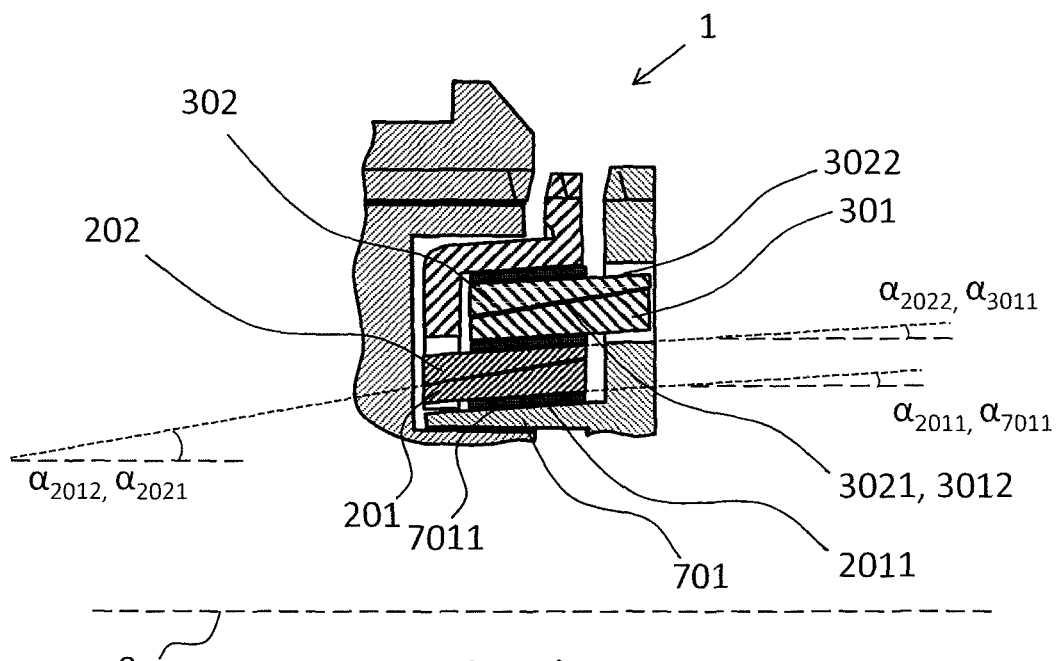
FIG. 2d a cross-section of a fourth embodiment of a synchronizing device according to the invention having three functional friction surfaces.

FIG. 2d shows a cross-section of a fourth embodiment of a synchronizing device 1 according to the invention having three functional friction surfaces.

As the synchronizing device 1 according to FIG. 2b, the synchronizing device 1 according to FIG. 2d also has a two-piece inner synchronizer ring 2, i.e. the inner synchronizer ring 2 is configured from a first conical inner ring body 201 and a second conical inner ring body 202.

In contrast to the synchronizing device 1 according to FIG. 2b the middle synchronizer ring 3 also is designed two-piece, i.e. the middle synchronizer ring 3 comprising a first conical middle ring body 301 and a second conical middle ring body 302. The second middle ring body 302 comprising a second inner surface of the middle ring 3021 and a second outer surface of the middle ring 3022 which each bound the second middle ring body 302 in the radial direction extending to the axial friction ring axis 8. The second inner surface of the middle ring 3021 extends at a second inner angle $\alpha_{3021}$ of the middle ring and the second outer surface of the middle ring 3022 at a second outer angle $\alpha_{3022}$ of the middle ring to the ring axis 8. Thereby the second inner angle $\alpha_{3021}$ of the middle ring corresponds to the first outer angle $\alpha_{3012}$ of the middle ring and the second outer angle $\alpha_{3022}$ of the middle ring to the first inner angle $\alpha_{3011}$ of the middle ring. In the operating mode the second inner surface of the middle ring 3021 is in contact with the first outer surface of the middle ring 3012 and the second outer surface of the middle ring 3022 interacts with the outer synchronizer ring 4.

The inner surface of the inner ring 2011 extends at a small inner angle $\alpha_{2011}$ of the inner ring. Though the inner angle $\alpha_{2011}$ of the inner ring corresponds to the gear wheel shoulder angle $\alpha_{7011}$, so that the inner surface of the inner ring 2011 and the gear wheel shoulder surface 7011 are interacting in the operating mode. The second outer surface of the inner ring 2022 interacting with the first inner surface of the middle ring 3011 in the operating mode also extends at a small outer angle $\alpha_{2022}$ of the inner ring.

Thus, the synchronizing device has three friction surfaces and two loosening surfaces.

In all embodiments mentioned above, a friction layer 10 can be provided one-sided and/or two-sided at the surfaces being in contact to each other in the operating mode. It is also possible providing an adhesion reducing surface structure at those surfaces, which do not serve as friction surfaces (loosening surfaces).

Furthermore, in all embodiments described above the first inner ring body 201 and/or the second inner ring body 202 and/or the first middle ring body 301 and/or the second middle ring body 302 and/or the intermediate ring body 901 may have a cutoff in a circumferential direction extending vertical to the axial ring axis 8, wherein the cutoff is open or closed in the non-operating mode.

Finally, in all embodiments described above the first inner ring body 201 and/or the second inner ring body 202 and/or the first middle ring body 301 and/or the second middle ring body 302 and/or the intermediate ring body 901 may have at least one limit stop for fixing in direction to the ring axis 8.

The invention claimed is:

1. A synchronizing device for a gear changing transmission of a motor vehicle, comprising:
an inner synchronizer ring comprising a first conical inner ring body with a first inner surface of the first inner ring body and a first outer surface of the first inner ring body, which bound the first inner ring body in a radial direction extending from an axial ring axis; a middle synchronizer ring; and an outer synchronizer ring, wherein in an operating mode:
the outer synchronizer ring and the inner synchronizer ring are connected essentially torque proof with a first shifting element, and the middle synchronizer ring is connected essentially torque proof with a second shifting element,
wherein the first inner surface of the first inner ring body extends at an acute first inner angle of the first inner ring body to the ring axis and the first outer surface of the first inner ring body extends at an acute first outer angle of the first inner ring body to the ring axis, and
wherein, in the operating mode, the first inner surface of the first inner ring body is interacting with the second shifting element and the first outer surface of the first inner ring body is one of indirectly or directly interacting with the middle synchronizer ring and wherein the first inner angle of the first inner ring body is smaller than the first outer angle of the first inner ring body.

2. The synchronizing device according to claim 1, wherein the inner synchronizer ring is made of the first conical inner ring body and a second conical inner ring body, the second inner ring body comprising a second inner surface of the second inner ring body and a second outer surface of the second inner ring body, which each bound the second inner ring body in a radial direction extending from the axial ring axis,
wherein the second inner surface of the second inner ring body extends at a second inner angle of the second inner ring body to the ring axis and the second outer surface of the second inner ring body extends at a second outer angle of the second inner ring body to the ring axis,
wherein the second inner angle of the second inner ring body corresponds to the first outer angle of the second inner ring body, and the second inner surface of the second inner ring body is form-locking connected, at least partially, to the first outer surface of the second inner ring body in the operating mode and the second outer surface of the second inner ring body interacts with the middle synchronizer ring.

3. The synchronizing device according to claim 1, wherein the middle synchronizer ring is configured from a first conical middle ring body and a second conical middle ring body,
wherein the first conical middle ring body comprises a first inner surface of the middle ring and a first outer surface of the middle ring which bound the first middle ring body in a radial direction extending to from the axial ring axis,
wherein the first inner surface of the middle ring extends at a first inner angle of the middle ring to the ring axis and the first outer surface of the middle ring extends at a first outer angle of the middle ring to the ring axis, and
the second conical middle ring body comprises a second inner surface of the middle ring and a second outer surface of the middle ring, which each bound the second conical middle ring body in a radial direction extending from the axial ring axis,
wherein the second inner surface of the middle ring extends at a second inner angle of the middle ring to the ring axis and the second outer surface of the middle ring extends at a second outer angle of the middle ring to the ring axis,
wherein the second inner angle of the middle ring corresponds to the first outer angle of the middle ring, and
wherein, in the operating mode, the first inner surface of the middle ring interacts with the inner synchronizer ring, the second inner surface of the middle ring is form-locking connected, at least partially, to the first outer surface of the middle ring and the second outer surface of the middle ring interacts with the outer synchronizer ring.

4. The synchronizing device according to claim 1, further comprising:
an intermediate synchronizer ring with a conical intermediate ring body, the intermediate ring body comprising an inner surface of the intermediate ring and an outer surface of the intermediate ring, which each bound the intermediate ring body in a radial direction extending from the axial ring axis,
wherein the inner surface of the intermediate ring extends at an inner angle of the intermediate ring to the ring axis and the outer surface of the intermediate ring extends at an outer angle of the intermediate ring to the ring axis,
wherein, in the operating mode:
the intermediate synchronizer ring is arranged between the outer synchronizer ring and the middle synchronizer ring and is connected torque proof to the inner synchronizer ring and the outer synchronizer ring, and
the inner angle of the intermediate ring corresponds to the first outer angle of the middle ring and the outer angle of the intermediate ring corresponds to an inner angle of the outer ring, so that the inner surface of the intermediate ring interacts with the first outer surface of the middle ring, and the outer surface of the intermediate ring is form-locking connected, at least partially, to the outer synchronizer ring.

5. The synchronizing device according to claim 1, wherein the first inner angle of the first inner ring body is 3-5°.

6. The synchronizing device according to claim 1, wherein a friction layer in the form of a carbon friction layer, is provided at least one of at the first inner surface of the first inner ring body or at the first outer surface of the first inner ring body.

7. The synchronizing device according to claim 1, wherein an adhesion reducing surface structure is provided at least one of at the first inner surface of the first inner ring body or at the first outer surface of the first inner ring body.

8. A gear changing transmission for a vehicle comprising: the synchronizing device according to claim 1.

9. The synchronizing device according to claim 2, wherein at least one of:
the second outer angle of the second inner ring body is 3-5°;
a friction layer in the form of a carbon friction layer, is provided at least one of at the second inner surface of the second inner ring body or at the second outer surface of the second inner ring body; or
an adhesion reducing surface structure is provided at least one of at the second inner surface of the second inner ring body or at the second outer surface of the second inner ring body.

10. The synchronizing device according to claim 3, wherein at least one of:
the first inner angle of the middle ring or the first outer angle of the middle ring or the second outer angle of the middle ring and/or the inner angle of the intermediate ring is 3-5°;
a friction layer in the form of a carbon friction layer, is provided at least one of at the first inner surface of the middle ring or at the first outer surface of the middle ring or at the second inner surface of the middle ring or at the second outer surface of the middle ring;

an adhesion reducing surface structure is provided at least one of at the first inner surface of the middle ring or at the first outer surface of the middle ring or at the second inner surface of the middle ring or at the second outer surface of the middle ring.

11. The synchronizing device according to claim 4, wherein at least one of:

the inner angle of the intermediate ring is 3-5°;

a friction layer in the form of a carbon friction layer, is provided at least one of at the inner surface of the intermediate ring or at the outer surface of the intermediate ring; or an adhesion reducing surface structure is provided at least one of at the inner surface of the intermediate ring or at the outer surface of the intermediate ring.

* * * * *